United States Patent [19]

Magoon

[11] Patent Number: 4,507,017
[45] Date of Patent: Mar. 26, 1985

[54] SEGMENTED, FLOATING FIREPROOF OIL-SPILL CONTAINMENT BOOM

[76] Inventor: Richard E. Magoon, 8545 27th St. West, Tacoma, Wash. 98466

[21] Appl. No.: 415,406

[22] Filed: Sep. 7, 1982

[51] Int. Cl.³ .............................................. E02B 15/04
[52] U.S. Cl. ....................................... 405/66; 405/71; 405/72
[58] Field of Search ........................ 405/63, 66, 67, 70, 405/71, 72

[56] References Cited

U.S. PATENT DOCUMENTS

| | | | |
|---|---|---|---|
| 3,564,852 | 2/1971 | Smith | 405/66 |
| 3,579,994 | 5/1971 | Preus et al. | 405/68 |
| 3,592,005 | 7/1971 | Greenwood | 405/71 |
| 3,597,924 | 8/1971 | Risin et al. | 405/71 |
| 3,638,430 | 2/1972 | Smith | 405/66 |
| 3,651,647 | 3/1972 | Flaviani | 405/71 |
| 3,740,955 | 6/1973 | Fossberg | 405/72 X |
| 3,744,253 | 7/1973 | Williams et al. | 405/66 |
| 3,751,925 | 8/1973 | Thurman | 405/71 |
| 3,783,622 | 1/1974 | Gambel | 405/66 X |
| 3,868,824 | 3/1975 | Thurman | 405/71 |
| 4,300,856 | 11/1981 | Magoon et al. | 405/66 |
| 4,303,351 | 12/1981 | Milgram | 405/66 |

FOREIGN PATENT DOCUMENTS

| | | | |
|---|---|---|---|
| 2446051 | 4/1975 | Fed. Rep. of Germany | 405/70 |
| 2402037 | 4/1979 | France | 405/70 |

*Primary Examiner*—David H. Corbin
*Attorney, Agent, or Firm*—Christensen, O'Connor, Johnson & Kindness

[57] ABSTRACT

A floatable, fire-resistant spill containment boom that is easily deployable on the surface of a body of water is comprised of a series of fire-resistant planar main panels having flotation devices attached thereto to maintain the main panels in a substantially upright position when deployed. A portion of each panel is submerged and a portion is above the water to form a continuous barrier to contaminants spilled on the water surface. A first group of the main panels have flotation devices mounted directly on the faces of the panels, while a second group of panels has the flotation devices mounted thereon in outrigger fashion on arms pivotally attached to the main panel to carry the flotation devices between a deployed position spaced from the panel and a stowed position closely adjacent the panel. The main panels are connected by a semirigid coupling panel interposed between each pair of adjacent main panels and rigidly attached to said adjacent main panels. Preferably, the flotation devices are comprised of masses of closed-cell glass foam enclosed in a container of fireproof material, such as metal.

20 Claims, 16 Drawing Figures

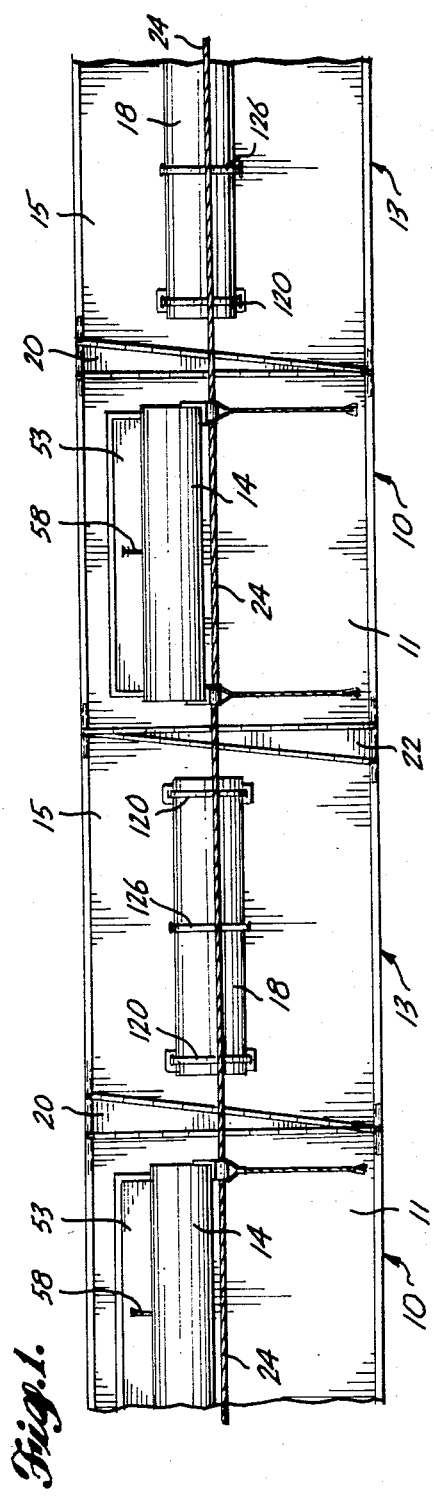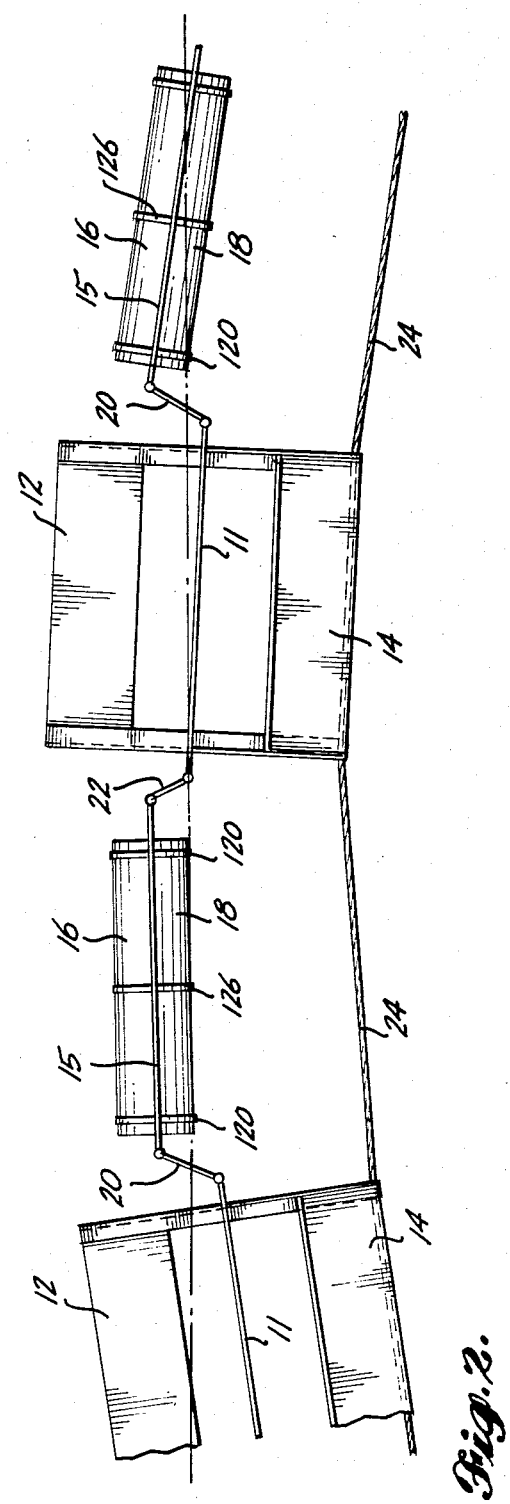

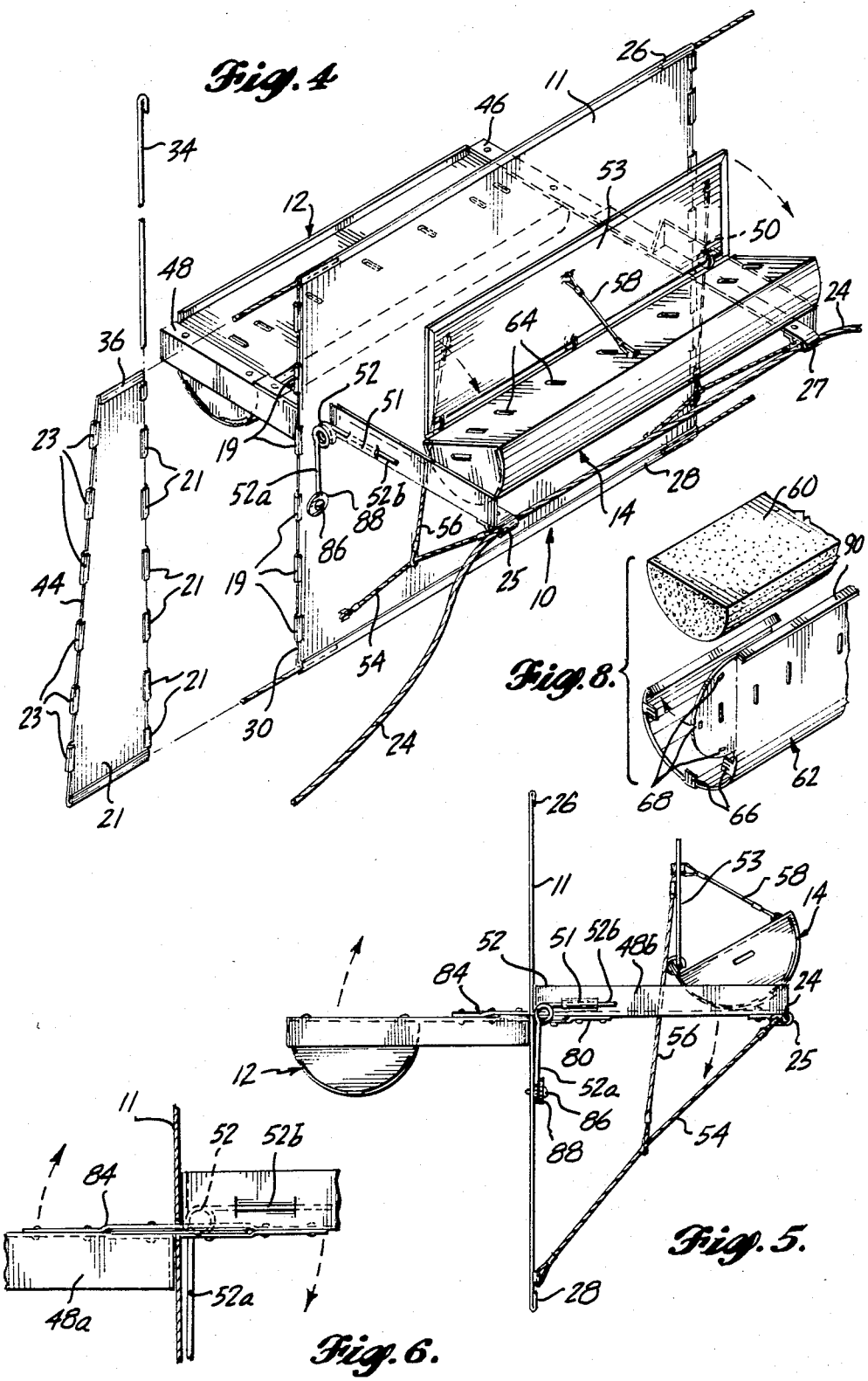

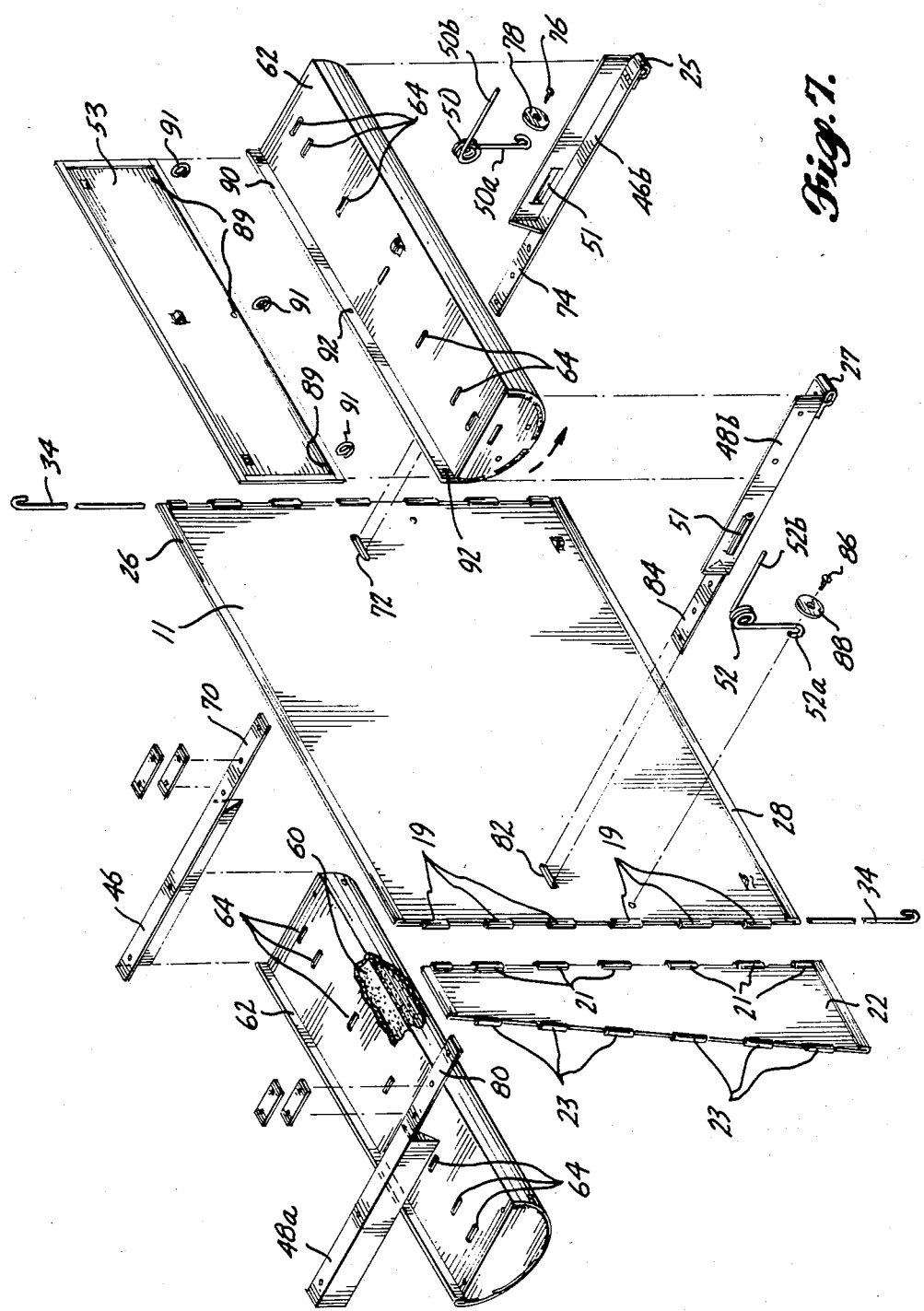

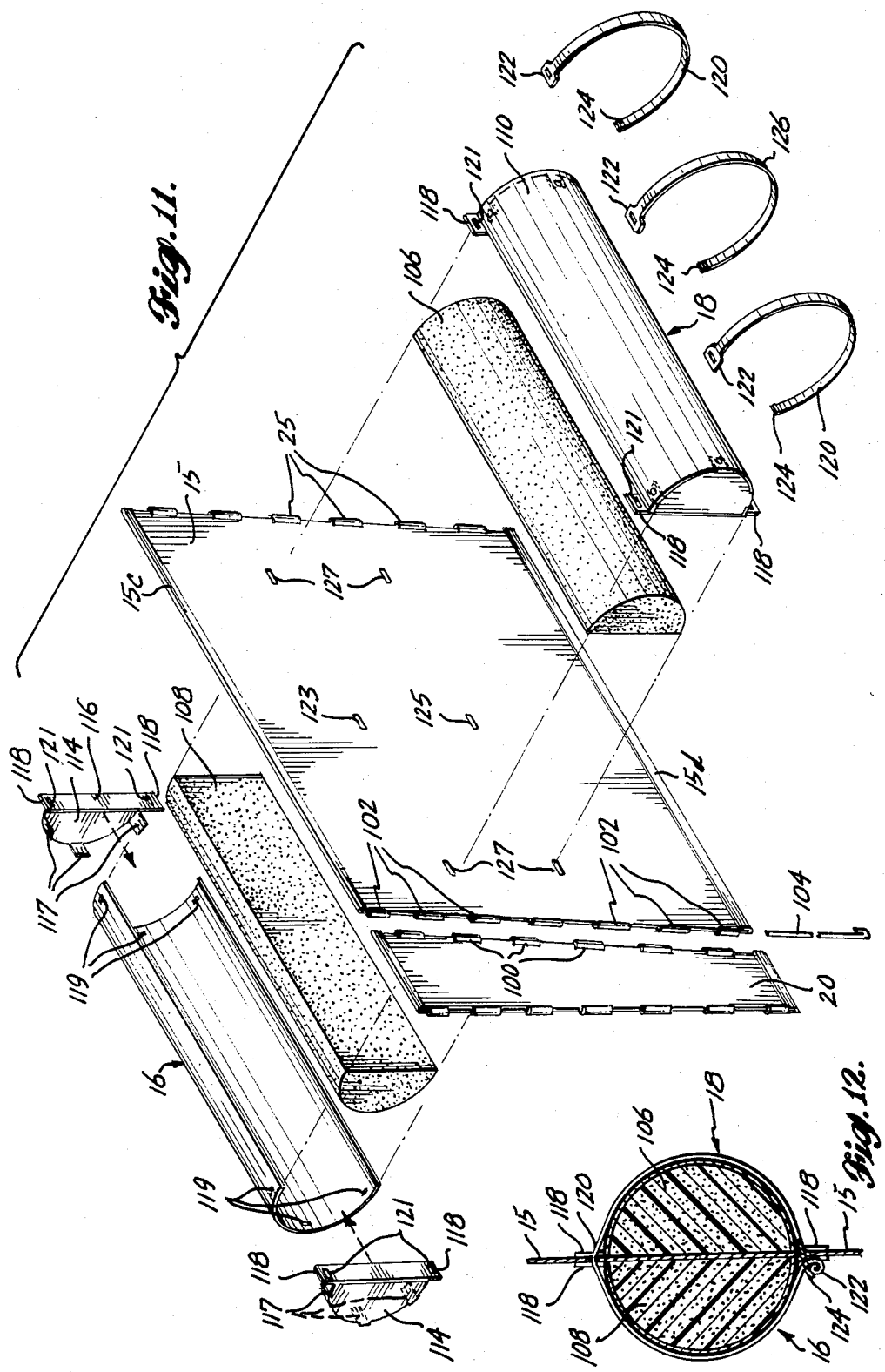

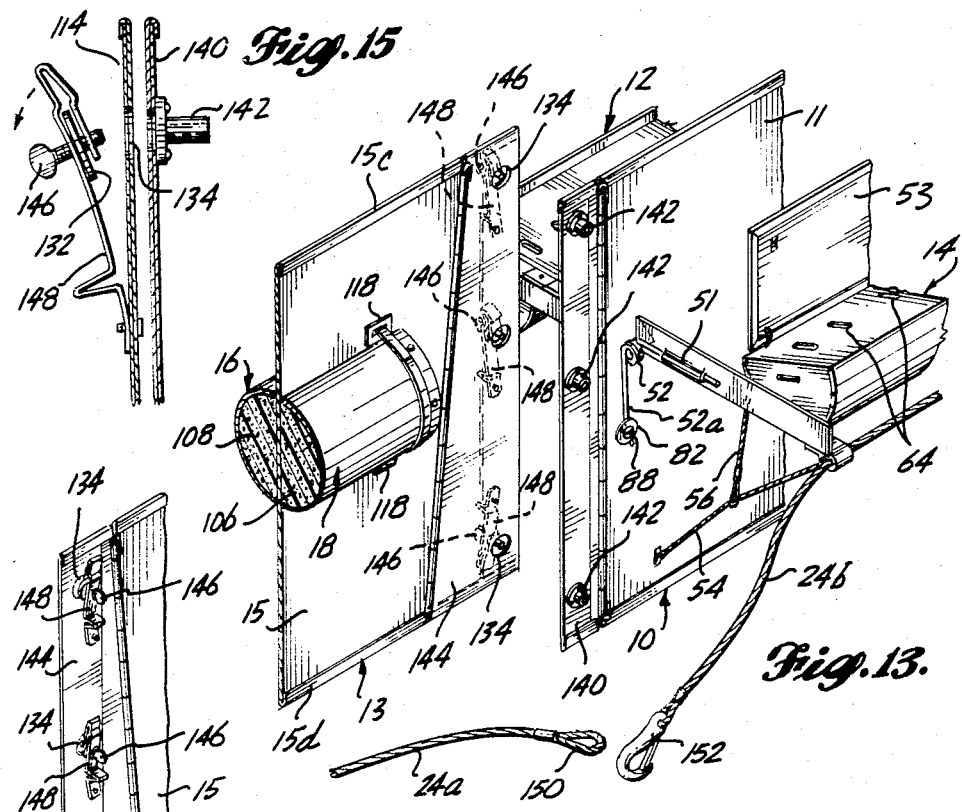
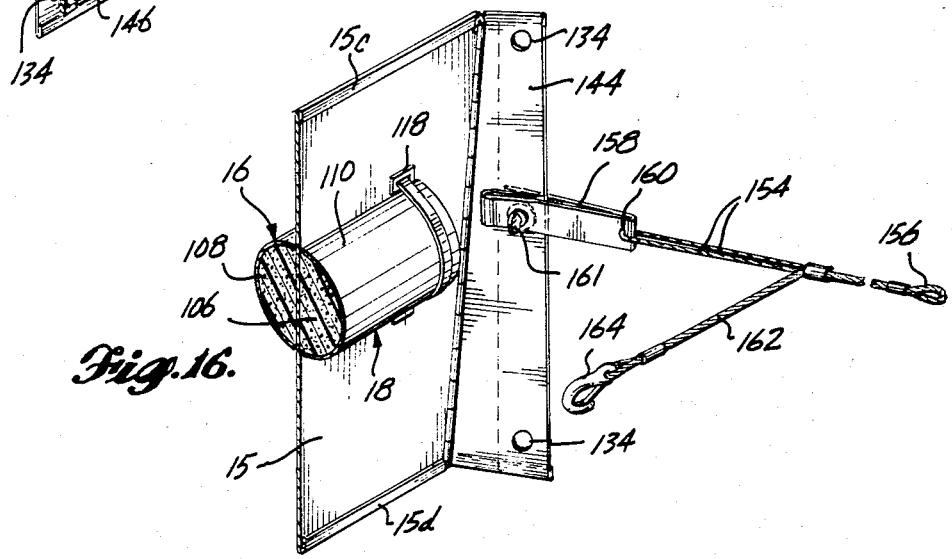

SEGMENTED, FLOATING FIREPROOF OIL-SPILL CONTAINMENT BOOM

BACKGROUND OF THE INVENTION

This invention relates to floating booms for controlling the spread of contaminants over the surface of water, and in particular relates to a fireproof oil-spill boom that is stored in a folded state and is quickly and easily deployable to its working state.

The proliferation of large oil tankers carrying petroleum products near coastal regions and the increased environmental awareness of the public at large has led to the need for and development of floating boom fences to surround and control the spread of oil spills and spills of other liquid contaminants in harbors and other coastal waters to prevent the oil or other contaminants from damaging coastal shorelines and the plant life and animal life living in those regions. U.S. Pat. No. 4,300,856, issued Nov. 17, 1981 to Magoon et al. and incorporated herein by reference, contains a brief but thorough discussion of several of the oil-spill containment booms that have been developed over the years.

A major problem, which has gone unaddressed in the majority of the prior art oil-spill booms, is the containment of a spill consisting of oil or some other flammable contaminant that has been ignited and is burning on the water's surface. Also, in certain instances, the simplest method of removing the contaminant from the water is to set it on fire and allow it to burn itself away in a confined area without the possibility of the burning contaminant reaching the shoreline, docks or other locations where it could do damage. Many of the conventional oil-spill booms have the problem, when confronted with a burning spill, of having the entire construction material of the boom burn away. At the very least, the flotation material that keeps the boom afloat is melted or vaporized thereby causing the boom to lose its buoyancy during the course of the fire due to the intense heat generated by the burning contaminant. Also, the booms tend to be so damaged by the heat and flames that they are not reusable.

It is therefore an object of the present invention to provide a floating oil-spill containment boom that can be utilized in the presence of flames and high temperatures to contain a burning spill of oil or other flammable contaminants without losing the flotation of the oil boom and also that will allow reuse of the boom for subsequent spill containment and repeated burning.

SUMMARY OF THE PRESENT INVENTION

In accordance with the above-stated objects, a floating contaminant spill containment boom is provided that includes adjacent planar panels constructed of a nonflammable material such as metal, preferably treated to avoid problems of corrosion during long term storage. The panels are hingedly attached to one another by means of a semirigid metal plate hingedly attached to each of the panels utilizing a hinge that is integrally formed with the panels themselves. Alternate ones of said panels have attached to them flotation devices mounted directly on the panel to provide flotation for the boom. The remaining panels have flotation devices mounted thereon in outrigger fashion on either side of the panels attached to arms that pass through the panels and pivot about an axis that lies in the plane of the panel and passes through the points of contact between the arms and the panel.

The flotation devices are preferably metal-encased masses of closed-cell glass foam to withstand the high temperatures developed by burning oil. The outrigger floats on one side of the panels are connected together by a cable that permits towing of the boom from a boat or other vessel. The connecting panels between adjacent boom fence panels are of a shape that provides sufficient flexibility so that the panels can move with the waves and tides substantially independent of one another within the parameters of typical ocean conditions.

BRIEF DESCRIPTION OF THE DRAWINGS

The present invention will be better understood by those of ordinary skill in the art and others upon reading the ensuing specification when taken in conjunction with the accompanying drawings wherein:

FIG. 1 is a front elevational view of one embodiment of an oil-spill containment boom made in accordance with the principles of the present invention deployed in containment orientation;

FIG. 2 is a plan view of the oil-spill containment boom of FIG. 1 with the boom being towed by two vessels, the boom following essentially a catenary curve;

FIG. 4 is an isometric view of a first segment of the oil boom shown in FIG. 1 having outrigger floats mounted thereon;

FIG. 5 is a side elevational view of the boom segment shown in FIG. 4;

FIG. 6 is a side elevational view in expanded scale of the hinge portion of the outrigger float arrangement of the boom segment shown in FIGS. 4 and 5;

FIG. 7 is an exploded isometric view of the boom segment shown in FIG. 4;

FIG. 8 is an exploded view showing the assembly of the flotation device attached to the outrigger arms of the boom segment shown in FIG. 4;

FIG. 11 is an exploded view of the boom segment shown in FIG. 9;

FIG. 12 is a side elevational view in expanded scale of the flotation devices attached to the boom segment shown in FIGS. 9 and 10;

FIG. 13 is an isometric view of a portion of the first boom segment shown in FIG. 4 and the second boom segment shown in FIG. 9 showing the attachment of the adjacent boom modules to one another;

FIG. 14 is an isometric view of the coupling portion of the boom segments shown in FIG. 13;

FIG. 15 is a side elevational view in expanded scale of a fastening device utilized to couple adjoining boom segments to one another; and FIG. 16 is an isometric view of one end of the boom having a towline adapter attached thereto.

DETAILED DESCRIPTION OF THE PREFERRED EMBODIMENT

Figure 3:
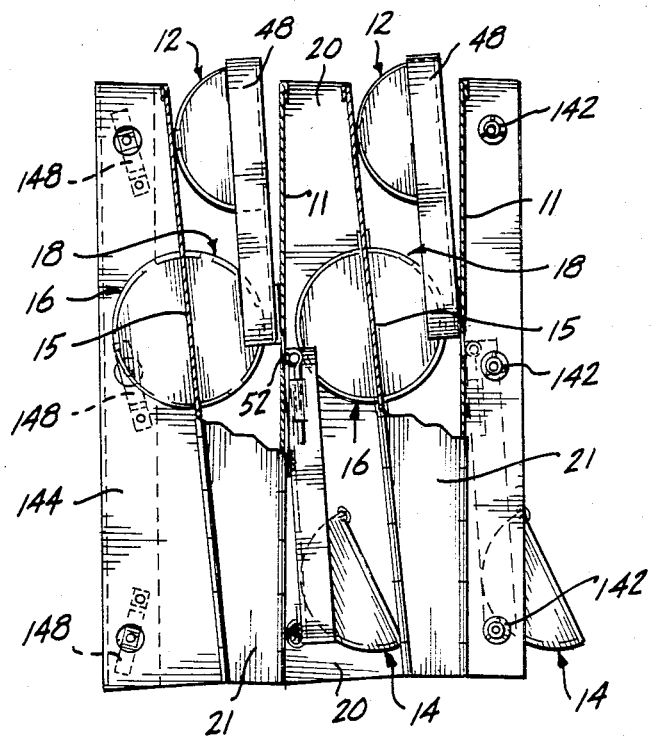
FIG. 3 is a side elevational view in partial section of the oil boom shown in FIG. 1 folded in its storage mode.

One embodiment of a fireproof oil-spill containment boom made in accordance with the principles of the present invention is shown in FIGS. 1 and 2. The oil boom of the present invention includes a series of individual segments hingedly attached to one another to form a continuous barrier to be placed around the oil spill to prevent flow of the oil or other contaminant across the barrier, thereby confining the spill to a limited area. Each segment is comprised of a rigid planar member, having flotation means affixed thereto to maintain the rigid member floating in a substantially upright position in the water, the boom segments are hingedly attached to one another to form a continuous containment boom. As pictured in FIGS. 1 and 2, the oil-spill boom of the present invention contains two types of segments alternately appearing in the boom fence arrangement. The boom segments 10 have flotation elements 12 and 14 attached to opposite sides of a generally rectangular planar member 11 in outrigger fashion to provide stability to the boom segment and to keep it in its substantially upright position. The alternate segments 13 have flotation elements 16 and 18 affixed directly to the opposing sides of a planar member 15 and are hingedly attached at either end of the planar member to the segments 10 by means of semirigid hinge panels 20 and 22. In the illustrated embodiment, the planar member 15 is in the general shape of a parallelogram and the hinge panels 20 and 22 are right angle trapezoids. The sides of the planar member 15 are cooperatively angled with respect to the sides of the hinge panels 20 and 22 so that the planar member 15 taken together with the flanking hinge panels 20 and 22 form a rectangle. A tow cable 24 runs along the length of the fence adjacent the flotation elements 14 and is attached at its ends to a vessel for towing the oil boom to move the oil spill into a more confined area once the fence has been deployed around the spill. FIGS. 1 and 2 show the oil boom in its deployed state and in the plan view of FIG. 2, the catenary curve assumed by the oil boom when it's being towed by two vessels is illustrated.

The pivotable hinge connections between adjacent planar members of the segments 10 and 13 permit the oil boom to be stored in a folded, compact state as pictured in FIG. 3. The oil boom is generally stored in a plurality of separate modules each consisting of two segments 10 and two segments 13. In the preferred embodiment, each of the individual modules can then be connected to one another by means that will be described in greater detail below and as many modules as necessary can be deployed to surround the particular spill in question to achieve the desired length of boom. In order to permit folding of the oil boom segments making up each module, the outrigger flotation elements 12 and 14 are hingedly mounted to the planar member 11 on arms passing through the planar member and hinged at their pass-through point. The outrigger flotation elements can then be folded against the planar member to reduce the size of the segment 10 and permit it to be carried in the folded state pictured in FIG. 3. The hinge arrangement of the flotation elements 12 and 14 will be described in greater detail below.

A typical oil boom segment 10 is shown in FIG. 4 in isometric view. The planar member 11 is comprised of a fire-resistant material, preferably galvanized metal or stainless steel to prevent corrosion from the long-term storage of the boom modules. In the preferred embodiment illustrated, the upper edge 26 and lower edge 28 of the planar member 11 are folded over to provide a rounded edge to prevent injury due to cutting on the sharp edge of the metal of the planar member 11. A side edge 30 of the planar member 11 is formed into tabbed sections, which are then rolled into spaced cylindrical formations 19 to provide one-half of the elements necessary to construct a piano-type hinge. The remaining elements 21 necessary for the piano-type hinge are formed on an edge 42 of the hinge panel 22, and cooperate with the elements on the planar member 11 to form a complete piano hinge arrangement. A hinge wire 34, preferably of stainless steel, passes through the cylindrical formations 19 formed on the planar member 11 and the hinge elements 21 formed on the hinge panel 22 to complete the formation of the piano hinge and maintain the hinge panel 22 in hingedly attached relation to the planar member 11. The hinge panel 22 is in the shape substantially of a right-angle trapezoid having a top edge 36 of a slightly shorter length than the bottom edge 38, side edge 42 adjacent the planar member 11 being at a right angle to the bottom edge 38. The second side edge 44 has the alternate sections 23 of a second piano hinge formed thereon that cooperate with hinge elements 25 formed on an edge of the planar member 15 from an adjacent boom segment of the type 13 to form a piano hinge of the type described above to attach the boom segment 13 to the boom segment 10. Preferably the tabs forming the hinge elements are riveted or spot-welded to their respective panels to prevent accidental opening of the hinge elements. Generally it is sufficient to weld or rivet only the end one or two hinge elements to achieve sufficient structural security.

To add structural integrity to the boom a flexible reinforcing cable 39 is placed across the joints of the planar members 11 and 15 and the hinge panel 22. The cable 39 extends a short distance beyond the joints and is continuous across the joints. The cable 39 is held captive within the folded top edges 26 and 36 of the planar member 1 and hinge panel 22. A similar flexible reinforcing cable 41 is placed on the opposite side of the panel 15 across the top edge of the hinge panel 20 between adjacent planar member 1 and 15.

The flotation elements 12 and 14 are affixed to the distal ends of support arms 46 and 48, which pass through the planar member 11. The arms 46 and 48 pivot about an axis that lies in the plane of the planar member 11 and passes through the points at which the arms 46 and 48 pass through the planar member 11. The arms 46 and 48 are biased into a position substantially orthogonal to the planar member 11 by means of first and second bias springs 50 and 52, each of which has a first tang attached to the planar member 11 and a second tang attached to their associated arms 46 and 48.

The tow cable 24 passes through a loop 25 formed in the end of the arm 48 adjacent the flotation element 14 and a loop 27 formed in the end of the arm 46 also adjacent the flotation element 14.

The flotation element 12 is substantially semicircular in cross section and has a flat surface facing upwardly as viewed in FIG. 4. The flotation element 12 depends downwardly from the arms 46 and 48 and the exact construction of the flotation element 12 will be described in greater detail below. The flotation element 14 is also semicircular in cross section and is mounted at a level such that the bottom of flotation element 14 is at the same level as the top of flotation element 12 as viewed in FIG. 4 and the flotation element 14 is canted slightly toward the planar member 11 such that when the planar member 11 is vertical the flotation element 14 is at a higher level than the flotation element 12. The reason for this is that since the tow cable 24 is on the same side of the boom segment 10 as the flotation element 14, the direction of movement of the segment 10, when it is under tow, will be to the right as viewed in FIG. 5 with the flotation element 14 in the lead. The resistance of the planar member 11 to the water will cause an instantaneous increase in the water level on the leading side of the boom segment 10, that is, the right side as viewed in FIG. 4. In order to maintain the flotation element 14 and the flotation element 12 both above the waterline at all times, it is necessary to position the flotation element 14 at a slightly higher level than the flotation element 12.

As the boom is towed, water will tend to wash over the flotation element 14. Water that washes over the flotation element 14 will tend to carry with it entrained oil in a flow pattern over the flotation element 14 and downwardly along the leading face of the planar member 11 and if the water action is sufficient, it may carry entrained oil deep enough to pass below the edge 28 of the planar member 24, escaping the containment area defined by the oil boom. In order to prevent this, a barrier plate 53 is hingedly attached to the trailing edge of the upper surface of the flotation element 14. In its stowed condition the barrier plate 53 will overlie the flat side of the semicylindrical flotation element 14. A series of control cables 54 and 56 is attached to the tow cable 24 and the barrier plate 53 in such a manner that when the oil boom is deployed and there is tension on the cable 24 it will pull the control cable 54 taught, in turn, placing a tension on the control cable 56, which lifts the barrier plate 53 upwardly as viewed in FIG. 4 toward the planar member 11 to provide a barrier to water attempting to pass over the top of the flotation element 14. A restrictor cable 58 is attached between the upper surface of the flotation element 14 and the barrier plate 53 to keep the barrier plate 53 from moving past a substantially upright position when the boom is deployed.

FIG. 8 is an exploded isometric view of the construction of the flotation elements 12 and 14. The flotation is provided by a semicylindrical, coherent mass of closed-cell glass foam 60 surrounded by a semicylindrical container 62. The semicylindrical container 62 is formed of a single piece of sheet metal rolled and cut to the appropriate shape so that when it is folded and assembled around the glass foam mass 60, the glass foam is completely encased in metal. Since the oil boom of the present invention is intended for use in situations where the contaminant, generally oil, is on fire, the fence components, including the flotation means, must be constructed in such a manner that they will withstand the high temperatures of an oil fire without losing their buoyancy or being permanently damaged, so that the float can continue to be used. Earlier attempts at producing oil booms have used several different flotation materials, including polyurethane foams and other closed-cell foam polymers, however, these polymers tend to melt or vaporize at the high temperatures encountered in an oil fire and thereby lose their flotation. The closed-cell glass foam, such as that sold under the trademark FOAMGLAS by Pittsburgh Corning of Pittsburgh, Pa., has been found by me to be able to withstand the high temperatures of an oil fire without losing its flotation ability. After exposure to temperatures in the neighborhood of 1700° (F.) some fracturing of the glass foam mass may occur, therefore, it is necessary to encase the glass foam so that the fractured portions are maintained in proximity to one another to provide sufficient flotation. However, as long as the fractured portions of glass foam are kept confined within the container 62, the flotation of the glass foam is not affected by exposure to high temperature.

The container 62 has a series of slots 64 formed in its upper surface. The purpose of the slots 64 is to permit water to pass in and out of the interior of the container 62 to cool the glass foam and container as much as possible. The container 62 has tabs 66 formed on the edges of the semicylindrical bottom portion of the container, which engage slots 68 in the end portions of the container. The tabs are then folded over to keep the container intact. In the preferred embodiment, the container seams can also be spot-welded at strategic locations to maintain its structural integrity, since the tabs 66 are prone to be unfolded if the fence is dragged during deployment or storage thereby causing the tabs to unfold and slip out of the slots 68.

FIG. 7 illustrates the construction of the typical boom segment 10. The arm 46 is composed of a first portion 46a, which is an angle-iron having a tab 70 extending from a first end thereof. The tab 70 passes through a slot 72 in the planar member 11. The first end of the arm portion 46a abuts the first face of the planar member 11. A second arm portion 46b is also formed of an angle-iron turned 180 degrees from the orientation of the arm 46a and has a tab portion 74 extending from a first end thereof. The tab portion 74 also passes through the slot 72 in the planar member 11. A pair of doubler plates 76a and 76b, respectively, are interposed between the tab portion 70 and tab portion 74 to provide rigidity to the arm 46. The tab portion 74 is attached by rivets or bolts to the arm portion 46a and the tab 70 is attached by rivets or bolts to the arm portion 46b to provide a rigid arm 46 on which the flotation elements can be attached. The arm 46 is pivotable in a plane that is orthogonal to the plane of the planar member 11 and pivots about the bottom edge of the slot 72.

The bias spring 50 has a first tang 50a, which is affixed to the planar member 11 by means of a rivet or bolt 76, which passes through a washer 78 and then through a loop formed in the tang 50a. The second tang 50b of the spring passes through and is captive within a protruding portion 51 of the arm section 46b. The spring is arranged to bias the arm 46 into a position substantially orthogonal to the planar member 11.

The support arm 48 is constructed in a similar manner to the arm 46 and is comprised of a first arm portion 48a having a tab portion 80 extending from a first end thereof passing through a second slot 82 in the planar member 11. A second arm portion 48b having a tab portion 84 extending from a first end thereof also passes through the second slot 82 and the arm portions 48a and 48b are joined to one another in the same manner as the arm portions 46a and 46b. A second pair of doubler plates 87a and 87b are interposed between the tab portions 80 and 84 to provide rigidity to the arm 48. A bias spring 52 has a first tang 52a attached to the planar member 11 by a bolt 86, which passes through a washer 88 prior to passing through a loop formed in the tang 52a. The second tang 52b of the spring is attached to the second arm portion 48b.

Flotation element 12 is comprised of one of the containers 62 underlying the arm portions 46a and 48a and attached to the underside of the arm portions at the flat side at the upper portion of the container 62. When the arms 46 and 48 are in their extended position, the upper surface of the container 62 is substantially horizontal.

The flotation element 14 includes a container 62 that overlies the arm portions 46b and 48b and is attached to the arm portions by bolts or rivets that pass through the upright leg of the angle iron that comprises the arm portion 46b and 48b and through the sidewalls of the container 62a.

The barrier plate 53 has a series of mounting holes 89 formed along a bottom edge, which is adjacent a protruding edge 90 at the trailing side of the container 62 of flotation element 14. Spring wire coils 91 pass through the mounting holes 89 and matching holes 92 formed in the extended edge 90 of the container 62 to pivotally attach the barrier plate 53 to the container 62.

An expanded scale view of the hinge point of the arms 46 and 48, as they pass through the planar member 11 is shown in FIGS. 5 and 6. The downwardly extending portion of the arm portion 46a and the upwardly extending portion of the arm portion 46b lie on opposite sides of the planar member 11 and abut the planar member 11 when the arms are in their extended position. The abutment of the arms with the planar member 11 provides a stop means to restrict rotation of the arms to ninety degrees.

Figure 9:
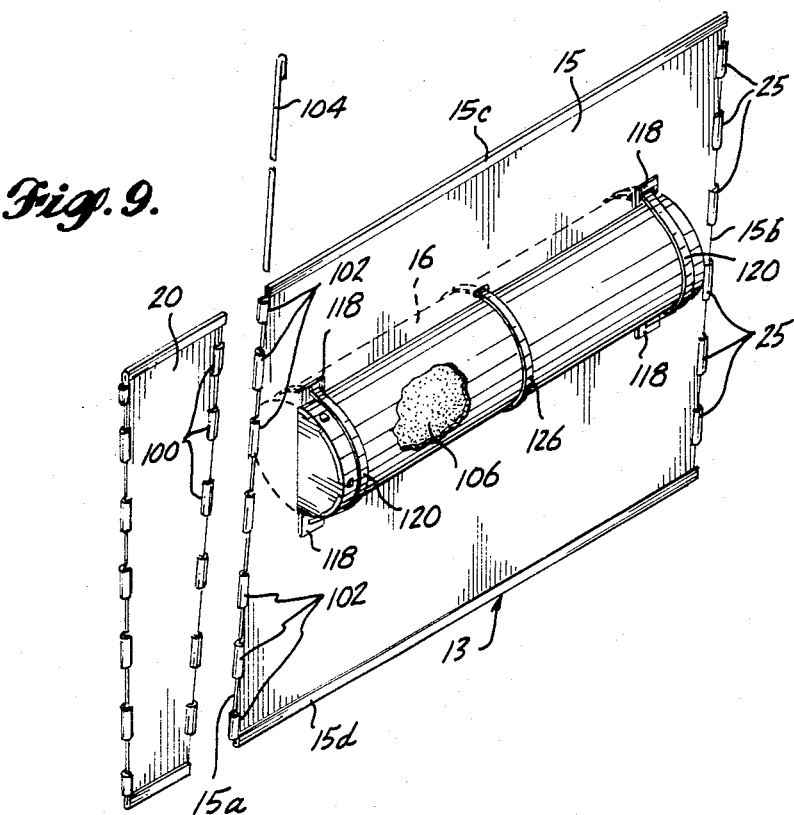
FIG. 9 is an isometric view of a second segment of the boom shown in FIG. 1 having flotation devices attached directly to the faces of the segment panel.
Figure 10:
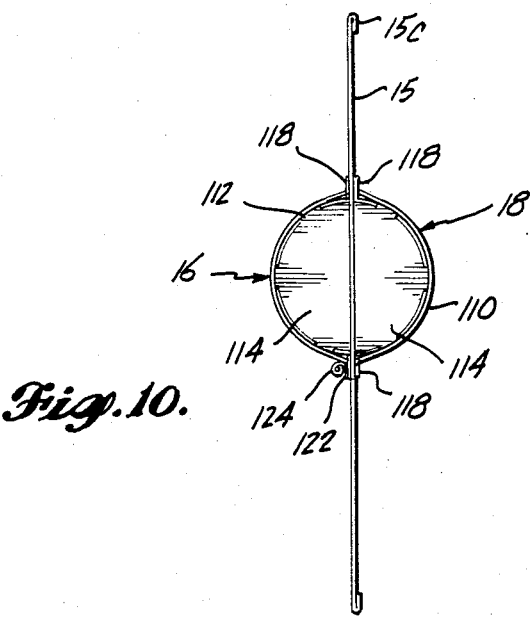
FIG. 10 is an end view of the boom segment shown in FIG. 9.

FIG. 9 illustrates in greater detail a typical boom segment 13 having flotation elements 16 and 18 mounted directly to the opposing sides of the planar member 15. A hinge panel 20 is hingedly attached to an edge 15a of the planar member 15 by means of a piano hinge formed by cooperating hinge segments 100 formed on edge 20a of the hinge plate 20 and hinge segments 102 formed on the edge 15a of the planar member 15. A wire 10, preferably of stainless steel, passes through the cooperating hinge segments 100 and 102. The wire, in the illustrated embodiment, is bent at each end after it is placed in the hinge to prevent it from slipping out of the hinge during working of the hinge when the boom is in the deployed state. Any means by which the wire 104 can be maintained within the hinge segments is suitable, for example, a knob on either end of the wire or some other means.

Referring to FIG. 11, the boom segment 12 is shown in exploded view, showing the assembly of the segment. The flotation elements 16 and 18 are comprised of semicylindrical pieces of closed-cell glass foam 106 and 108 enclosed within metal casings 110 and 112, respectively. The metal casings 110 and 112 are formed of a semicylindrical sheet metal piece 113 having end caps 114 and 116 mounted to it by means of tabs 117 in the end caps, which engage slots 119 formed adjacent the side edges of the semicylindrical sheet metal piece 113. The end caps 114 and 116 can also be spot-welded to the sheet metal piece 113 to prevent accidental opening of the tabs, if the boom fence is dragged and the tabs engage some resistance. Mounting ears 118 are formed on the casings 110 and 112 and are adjacent the associated surface of the planar member 15 when the segment 13 is assembled. Slots 121 in the mounting ears 118 receive mounting straps 120 that pass through the slots in the mounting ears and slots 127 formed in the panel 15 and around both of the metal casings 110 and 112 and then pass through an integral buckle portion 122 formed in each of the straps. A first end 124 of the strap is then rolled as illustrated in FIG. 12 to tighten the strap against the casing and keep the strap from slipping back out through the buckle portion 122, thereby fastening the canisters 110 and 112 to the opposing sides of the planar member 15. A third strap 126 can be utilized to more securely fasten the casings to the planar member.

The strap 126 passes around a central portion of the casings passing through slots 123 and 125 formed in the planar member 15. The upper and lower edges 15c and 15d, respectively, of the planar member 15 are preferably folded over to provide rounded, safer edges so that personnel handling the boom segments will not cut themselves on sharp edges of metal.

As was described earlier, and as shown in FIG. 3 the boom is typically stored in modules consisting of two segments of the type 10 and two segments of the type 13 joined to one another by means of the hinge panels 20 and 22, using integral piano hinges formed by cooperating hinge segments in the edges of the planar members 11 and 15 and the hinge panels 20 and 22. Each of the modules must then be connected together in order to form a boom of usable length in deployment. In order to facilitate easy assembly of the boom modules into a completed boom assembly, a module interconnection means as pictured in FIGS. 13, 14, and 15 is utilized. As deployed, the leading edge of each module is typically a segment of the type 10 and the trailing edge of the deployed module is typically a segment of the type 13. The leading edge of the segment 10, which leads the module deployment, has a coupling panel 140 hingedly attached to it by means of an integral piano hinge of the type described above. The coupling panel 140 has affixed to it threaded nut assemblies 142, which cooperate with bolts 146 attached to the trailing edge of the trailing boom segment 13 of the module previously deployed. The trailing edge of the trailing boom segment 13 of the previously deployed module has a second coupling panel 144 hingedly attached to a trailing edge of the planar member 15 by means of an integral piano hinge of the type described above. The second coupling panel 144 has a series of thumb-screw bolts 146 tethered by means of a spring member 148 to the panel 144. The spring member 148 is bolted or riveted to the second coupling panel 144 as shown in FIG. 15. The thumb-screw bolt 146 is held captive in a free end of the spring member 148 by means of a washer 132 and the looped end 130 of the spring member 148. To assemble the trailing boom segment 13 to the leading boom segment 10, the operator forces the thumb-screw bolt 146 through an opening 134 formed in the second coupling panel 144 and brings the second coupling panel 144 into adjacent relationship with the coupling panel 140. The operator then threads each of the bolts 146 into the associated nut assembly 142 to couple the trailing segment 13 to the leading segment 10 of the next boom module. Once the bolts have been threaded into the nut assemblies, the looped end 130 of the spring member can be bent down over the head of the thumb-screw bolt to secure the bolt and prevent it from being turned and loosened by movement and vibration of the boom. The tethering of the thumb-screw bolt 146 to the second coupling panel 144 eliminates the possibility of an operator in rough seas dropping the bolt during the coupling process and makes it easier to align the bolt to the nut assembly 142. A cable section 24a from the next preceding fence segment of the type 10 (not shown in FIG. 12) extends to the end of the boom module and has a loop 150 formed in its end, which cooperatively engages a cable hook 152 attached to the leading end of a cable segment 24b associated with the leading segment 10 of the next to be deployed boom module to provide continuity of the cable 24.

When sufficient modules have been developed to form a boom of desired length, it is necessary to attach the trailing end of the boom to the towline from a second vessel that is to tow the completed oil boom in its containment mode. A towline connector is shown in FIG. 16 and includes a cable segment 154 having a loop 156 formed in a first end thereof for connection to the towline and having at its second end an adaptor piece 158 consisting of a V-shaped sheet metal piece with a hole 160 formed in a first end thereof attached to the cable segment 154. One of the V arms of the sheet metal segment 158 has a thumb-screw bolt 161 held captive therein in the same manner as in the second coupling plate 144 and the other arm of the sheet metal V segment has a nut 163 assembly of the same type as nut assembly 142 affixed thereon. The towline connector is mounted to the trailing end of a segment of the type 13 by passing the bolt 144 through the centrally located opening 134 formed in the second coupling plate 144 and threadably engaging it with the nut assembly 163 to clamp the sheet metal piece 158 to the second coupling panel 144. A cable adapter segment 162 is spliced to the cable segment 154 at a first end thereof and at a second end thereof has a cable attachment hook 164 attached, which hook engages the eye 150 formed in the trailing end of the segment of the cable 24 associated with the last deployed boom module.

When the boom is deployed in its oil containment mode, the wave action typically associated with any body of water in which the boom is deployed makes it necessary for the individual boom segments to move independently of adjacent segments to some degree in order to compensate for wave action. The required flexibility of movement of individual boom segments is provided by the particular shape of the hinge panels 20 and 22, described above. As is illustrated in FIG. 2, when the boom is deployed and under tow, the forces on the fence segments will cause the hinge panels 20 and 22 to lie at some oblique angle approaching ninety degrees, with respect to the planar members 11 and 15. The manufacture of the hinge panels 20 and 22 of a semirigid material, such as thin-gauge sheet metal, provides flexibility to the hinge panels and the shape of the panels provides that adjacent segments of the boom can move independently of one another in an amount sufficient to permit the boom to compensate for wave and tidal action. At the same time, the use of metal hinges, maintains the fireproof integrity of the overall oil boom and for that purpose is superior to the use of materials such as fiberglass or rubber to form the connection.

In summary, therefore, a fireproof oil boom capable of easy deployment and being foldable to a compact state for easy storage has been disclosed. The major boom segments are formed of planar panels of fire-resistant material hingedly connected to one another by semirigid coupling panels also constructed of fireproof material. The interconnection between the main boom panels and the coupling panels is accomplished in a given individual boom module through the use of piano hinges integrally formed in the main boom panels and hinge panels, respectively. Interconnection between adjacent boom modules is accomplished through means of a coupling adapter including nut assemblies affixed to the leading edge of the lending segment of the boom module about to be deployed and bolt assemblies held captive on the trailing edge of a previously deployed boom module for easy interconnection at sea. The flotation for the boom is provided by masses of closed-cell glass foam, encapsulated in fireproof casings, for example, metal canisters, attached to alternate ones of the boom panels directly and attached on hinged outrigger assemblies to the remaining boom panels.

While a particular embodiment of the oil boom of the present invention has been described and illustrated it will be appreciated by those of ordinary skill in the art and others that changes can be made to the illustrated embodiment while remaining within the scope of the present invention. For example, the container for the flotation material, as well as the main boom panels and hinge panels, could be made of fire-resistant materials other than metal, such as formed refractory cement containing ceramic fiber or carbon fiber. Therefore, the invention should be defined solely by reference to the appended claims.

The embodiments of the invention in which an exclusive property or privilege is claimed are defined as follows:

1. A foldable, floatable fireproof spill-containment boom easily deployable on the surface of a body of water comprising:

a series of fireproof planar main panels, said main panels having flotation devices attached thereto, said main panels being of a first type and a second type, the panels of said first type having flotation-mounting arms associated therewith, said flotation devices being mounted on respective ends of said flotation-mounting arms in outrigger fashion on each side of said main panel and said main panels of said second type having said flotation devices attached directly to said main panel;

said flotation devices including a shell constructed and arranged to contain a flotation material, said flotation material comprising a closed-cell glass foam of a density of approximately 8.5 pounds per cubic foot and a fire-resistance temperature of approximately 900 degrees F., said shell being further constructed and arranged to enclose said flotation material in such a manner as to promote the wicking of water around said flotation material while enclosing steam formed by said water when contacting said flotation material in a high-temperature environment; and hinge means hingedly attaching adjacent ones of said main panels of said first and second types in alternating fashion, said hinge means including semirigid hinged coupling panels of right-angle, trapezoidal configuration, each of said trapezoids having first and second opposing edges, said second edge being longer than said first edge, said trapezoidal panels being arranged in alternating manner so that said first edge is above said second edge in a first coupling panel and said first edge is below said second edge in a second adjacent coupling panel.

2. The boom of claim 1 wherein said main boom segments of said first and second type are alternately placed in said boom, said main panel segments of said first type being of a substantially rectangular shape and said main panels of said second type being in the shape of a paralleleloid, said main panels being connected to one another by hinged trapezoidal connector panels, a first edge of which is smaller than a second edge thereof, said trapezoidal connector panels being placed alternately first with said first edge up and then with said second edge up.

3. The boom of claim 1 or 2 wherein said flotation devices include a mass of closed-cell glass foam encased within a shell of fireproof material constructed and arranged to cool said foamed glass by permitting the wicking of water around said foam and at the same time enclosing steam formed by the contact of said water with said glass foam in the presence of high temperature so as to maintain the temperature of said glass foam below 900 degrees F. in a generalized environmental temperature of over 1800 degrees F.

4. The boom of claim 3 wherein said fireproof shell is composed of stainless steel.

5. The boom of claim 3 wherein said shells of said flotation devices are designed specifically to promote wicking of water up around said glass foam so as to provide cooling of said shell and the glass foam contained therein.

6. The boom of claim 3 wherein said fireproof shell is composed of galvanized steel.

7. The boom of claim 3 wherein said shell of said flotation device has ports formed therein to permit the passage of water into said shell to contact said foamed glass and to direct the passage of water and steam to cool the shell and foamed glass under fire conditions while maintaining cracked segments of said foamed glass within said shell to maintain flotation of said boom.

8. The boom of claim 1 or 2 wherein said main panel sections include first and second edges, each of which is integrally formed into segments of a piano hinge, said edges being cooperable with vertical edges of said trapezoidal shaped connector panels that are formed into cooperable mating segments of said piano hinge, said boom further including a plurality of stainless steel connecting pins, one of such connecting pins cooperating and held captive within the cooperative segments of said piano hinge to maintain said piano hinge in working condition, said piano hinge segments being formed integrally with said panels and being of the same material thereof.

9. The boom of claim 2 wherein said flotation-mounting arms are mounted hingedly on said main panels of said first type, said flotation devices being mounted on the distal ends of said flotation-mounting arms and said boom further including a continuous cable passing through loops integrally formed at said distal ends of said flotation-mounting arms on an advancing side of said boom when said boom is towed in a catenary curve, said cable being constructed and arranged to provide structural integrity to said boom and to space the distance between said outrigger floats so as to keep said semi-rigid trapezoidal connector panels at substantially a 90-degree angle to said main panel sections, thereby providing an all-axis freedom of movement of each panel section independent of each other panel section.

10. The boom of claim 1 wherein said flotation devices mounted on said panel of said first type are mounted on the ends of outrigger arms passing through pivot slots formed in said main panel, said arms being pivotable about an axis lying within the plane of said panel, said boom further including springs cooperably associated with said main panel and said outrigger arms to bias said outrigger arms to a deployed position essentially orthogonal to said main panel and further including abutment means adjacent said main panel formed on said outrigger arms to limit the field of rotation of said outrigger arm to less than 90 degrees with respect to said main panel.

11. The boom of claim 1 or 10 wherein said flotation devices are mounted on said outrigger arms such that when said boom is towed in a catenary curve the leading floats are at a higher level than the retreating floats, thereby ensuring that both leading and retreating floats bear upon the water to maintain the main panel in a substantially vertical position.

12. The boom of claim 1 wherein a boom module includes a predetermined number of main panel sections of said first type and a predetermined number of said main panels of said second type, said main panels being pivotally attached to one another by a coupling means, said boom being comprised of a plurality of said boom modules coupled to one another to achieve a desired length.

13. The boom of claim 12 further including coupling means associated with the leading and trailing main panels of each boom module for releasably attaching said trailing main panel of a deployed boom module to the leading main panel of the next to be deployed boom module, said boom module coupling means including a nut panel hingedly affixed to a leading edge of the leading main panel of the next to be deployed boom module, said nut panel having a plurality of nut means affixed thereto and a bolt module hingedly attached to a trailing edge of the trailing main panel of the deployed boom module, said bolt panel having a plurality of thumb screw bolts tethered thereto, said tethered bolts and said nut means being adapted for threaded interconnection to attach said leading edge to said trailing edge.

14. The boom of claim 1 or 9 wherein said hinge panels are of a right-angle, trapezoidal configuration, said hinge panels having first and second edges parallel to one another, said first edge being longer than said second edge, said hinge panels being distributed in said boom such that alternate ones of said connecting hinge panels have said first edge above said second edge and the alternate has said first edge below said second edge, said hinge panels being constructed and arranged so that in the deployed state of said boom said connecting hinge panels will assume a position oblique to the plane of said main panels when properly spaced by said cable affixed to the flotation-mounting arms of said outrigger float sections.

15. The boom of claim 1 wherein said main panels and said hinge panels are composed of galvanized sheet steel of the thinnest cross section possible consistent with the size of the boom chosen for the location of use.

16. The boom of claim 1 wherein said main panels and said hinge panels are composed of stainless steel sheet metal of the thinnest cross section possible consistent with the size of the boom chosen for the location of use.

17. The boom of claim 1 wherein said main panels, hinge panels, and glass foam-encasing shells are constructed of woven ceramic fiber stiffened with refractory cement.

18. The boom of claim 1 wherein said main panels, connecting hinge panels, and glass foam-encasing shells are constructed of woven carbon fiber stiffened with refractory cement.

19. The boom of claim 3 wherein said closed-cell glass foam has a density of approximately 8.5 pounds per cubic foot, a high-temperature resistance factor of 900 degrees F., and a water permeability of zero.

20. The boom of claim 1 wherein an anti-entrainment device is hingedly attached to the inboard edge of the advancing float of the main panels of the first type, said anti-entrainment panel being mounted on said float such that when said oil-spill boom is towed in a catenary curve said anti-entrainment device acts to prevent water from breaking over the top of said leading float and entraining oil in the area between the float and the main panel, said anti-entrainment device comprising a metal plate hingedly mounted on said float at one end thereof.

* * * * *